United States Patent [19]

Chumak et al.

[11] Patent Number: 5,578,198
[45] Date of Patent: *Nov. 26, 1996

[54] DEVICE FOR AUTOMATIC REGULATION OF THE PROCESS OF SEPARATING FROTH CONCENTRATE FROM GANGUE IN A FLOATATION MACHINE

[75] Inventors: Fedor A. Chumak, Udachny; Vladimir N. Cherednik; Mikhail N. Zlobin, both of Mirny, all of U.S.S.R.

[73] Assignee: Yakutsky Nauchno-Issledovatelsky I Proektny Institut Almazodbyvajuschei Promyshlennosti, Mirny, U.S.S.R.

[ * ] Notice: The terminal 51 months of this patent has been disclaimed.

[21] Appl. No.: 586,259

[22] Filed: Sep. 21, 1990

[51] Int. Cl.$^6$ .................................. B03D 1/00; B03D 1/02
[52] U.S. Cl. ........................... 209/168; 209/166; 209/1; 209/164
[58] Field of Search ................................ 209/1, 166, 167, 209/164, 168

[56] References Cited

U.S. PATENT DOCUMENTS

| | | | |
|---|---|---|---|
| 3,474,902 | 10/1969 | Putman | 209/166 |
| 3,551,897 | 12/1970 | Cooper | 209/166 |
| 4,552,651 | 11/1985 | Sandbrook | 209/166 |

FOREIGN PATENT DOCUMENTS

| | | | |
|---|---|---|---|
| 662150 | 2/1978 | U.S.S.R. | 209/166 |
| 2180779 | 4/1987 | United Kingdom | 209/166 |

OTHER PUBLICATIONS

"Systemy automaticheskogo kontrolya i upravlenia tekhnologicheskimi protsessami flotatsionnykh ustanovok" by Kovin et al, Nedra Publishers, Moscow 1981 pp. 69–73. (no translation).

Primary Examiner—Stanley S. Silverman
Assistant Examiner—Thomas M. Lithgow
Attorney, Agent, or Firm—Burgess, Ryan and Wayne

[57] ABSTRACT

The automatic regulator device comprises a channel for measuring the level and density of pulp in the chamber of a floatation machine, in which two bubbling pipes are in communication with a differential pressure pickup connected to the input of a frother flow-rate regulating channel and to one input of a correction unit whose other input is connected to a pressure pickup communicating with one of the bubbling pipes. The output of the correction unit is connected to the input of a circuit designed to regulate the rate of flow of water with frother in a pulp level stabilizing channel, the output of said circuit being connected to an actuator valve installed on a pipeline feeding water with frother and furnishing a control signal with respect to a pulp level deviation from a preset value. A water-and-frother flow transducer is connected to the input of a circuit designed to regulate the gangue discharge rate in the pulp level stabilizing channel, the output of said circuit being connected to the drive of the actuator valve installed on a gangue discharge branch pipe, said output developing a control signal with respect to a deviation of the water-and-frother flow rate from a preset value.

3 Claims, 3 Drawing Sheets

DEVICE FOR AUTOMATIC REGULATION OF THE PROCESS OF SEPARATING FROTH CONCENTRATE FROM GANGUE IN A FLOATATION MACHINE

FIELD OF THE INVENTION

The present invention relates to concentration of mineral raw materials by floatation of hard particles of a useful constituent thereof and, more particularly, to a device for automatic regulation of the process of separating froth concentrate from gangue in a floatation machine.

The invention can find applications in ferrous and nonferrous metallurgy, coal and diamond industries for floatation of mineral resources, in which a valuable constituent represents fairly small or large inclusions possessing hydrophobic properties.

BACKGROUND ART

In prior art floatation machines the process of separating froth concentrate from gangue involves either froth floatation at which the source feed is pulp containing small fractions of a material to be concentrated or a combination of froth floatation and froth separation at which the source feed contains both small fractions of a material to be separated and a large fraction thereof supplied to the froth layer. The techniques involving froth floatation and a combination of froth floatation and froth separation are characterized by the need to maintain a predetermined pulp level in the chamber of a floatation machine relative to its overflow threshold, thereby keeping the froth layer thickness and the pulp-froth interface within required limits; to ensure a predetermined ratio between liquid and gaseous phases in the pulp supplied to the chamber of a floatation machine, the density and level of the pulp in the chamber being primarily determined by said ratio; to maintain optimal concentration in the aerated pulp of frother supplied both with circulating water and directly with the source feed, which determines the size, degree of dispersion and the lifting speed of air bubbles and, consequently, the density of the aerated pulp; to provide an optimal speed of supplying the source feed to the bulk of the aerated pulp in the chamber of a floatation machine, variations of said speed adversely affecting flow hydrodynamics; to discharge gangue from the chamber with minimum losses of the pulp liquid phase; and to rapidly restore the pulp level and density in the chamber to preset values.

Variations of the pulp level and, consequently, of the froth layer and also of the ratio between the solid, liquid and gaseous phases of the pulp are attributable, firstly, to changes in the quantity of the source solid and water in the chamber of a floatation machine and, secondly, to changes in liquid phase losses when gangue is discharged due to a varying amount of the solid and large and heavy fractions thereof. Variations of the pulp level in the chamber of a floatation machine are also attributable to changes in the pulp density due to a varying concentration of frother in the pulp.

A change in the speed of supplying the pulp to the chamber of a floatation machine is caused by a variation of the solid—water ratio in the pulp. Thus, the disturbing factors affecting the process of froth floatation include changes in the quantity of the solid and liquid phases of the pulp fed to the chamber of a floatation machine, changes in the quantity of the liquid phase lost in discharging the gangue due to a varying content of large and heavy fractions therein, and changes in the concentration of frother in circulating water supplied to the chamber, which cause variations of the liquid and gaseous phases in the pulp and, consequently, of the pulp level and density in the chamber of a floatation machine.

From the aforesaid it follows that, at the present time, a vital problem in the art is quality regulation of the processes of froth floatation and froth separation combined with froth floatation, which involves related adjustment of several parameters. This problem is particularly acute with large-capacity floatation machines due to great sluggishness of a floatation installation comprising such machines and also due to the presence of powerful disturbing factors which are widely different.

The above problem is partially solved in a known device for automatic regulation of the process of separating froth concentrate from gangue in a floatation machine (cf. G. M. Kovin et al. "Systemy avtomaticheskogo kontrolya i upravlenia tekhnologicheskimi protsessami flotatsionnykh ustanovok". Moscow, "Nedra" Publishers, 1981, pp. 69–73), comprising a pulp level measuring circuit wherein a bubbling pipe located in the chamber of the floatation machine communicates with a pressure pickup and with an air flow regulator. The output of the pressure pickup is connected to a pulp level recorder and to the input of a circuit designed to regulate the rate of discharging gangue from the chamber of the floatation machine, the output of said circuit being connected to the drive of a control valve installed on a branch pipe used to discharge gangue from the chamber of the floatation machine. The foregoing device also includes a frother flow-rate regulating circuit wherein the rate of frother flow is regulated in proportion to the flow of gangue discharged from the chamber as pulp.

Such an automatic regulator device does not provide for required regulation quality due to the fact that, during measurements of the pulp level in the chamber of the floatation machine, no account is taken of the error associated with pulp density variations.

If no pulp density monitoring means are provided, frother metering with respect to the flow rate of gangue discharged as pulp is very approximate and upsets the processes of froth formation and hydrodynamics in the chamber due to considerable variations of the pulp density, which hinders the process of pulp level stabilization. Furthermore, the absence of such a regulating factor as stabilization of the flow rate of water containing frother during floatation impairs the pulp density.

Thus, the foregoing automatic regulator device does not provide for required regulation quality, particularly with large-capacity floatation machines due to the influence of powerful disturbing factors and great sluggishness of floatation installations utilizing such machines.

The above problem is partially solved in another known device for automatic regulation of the process of separating froth concentrate from gangue in a floatation machine (cf. GB, A, 2180779), comprising a channel for measuring a pulp level and density in the chamber of the floatation machine, in which two bubbling pipes installed at different levels in the bulk of the pulp in the chamber of the floatation machine are in communication with air flow regulators and a differential pressure pickup connected to the input of a channel designed to regulate the flow rate of frother supplied to the chamber of the floatation machine and to one data input of a pulp level correction unit whose other data input is connected tea pressure pickup communicating with one of the bubbling pipes, while the output of said pulp level correction unit is connected to the input of a channel used for stabilizing the pulp level in the chamber of the floatation machine and incorporating a circuit designed to regulate the rate of discharging gangue from the chamber of the floatation machine and connected to a gangue-discharge control valve installed on a branch pipe adapted to discharge gangue from the chamber of the floatation machine.

Similarly to the previously mentioned device, the last described automatic regulator device does net provide for required regulation quality, a disadvantage associated with the fact that stabilization of the pulp level solely by changing the rate of gangue discharge from the chamber of a floatation machine is generally ineffective, particularly with large-capacity floatation machines due to great sluggishness of a floatation installation comprising such a machine and also due to the presence of strong disturbing effects and an insufficient regulating action to rapidly restore the pulp level to a preset value. A mere increase in the gain of the pulp level stabilizing channel at a high level of disturbances will result in system driving, overcontrol and an excessive regulation time whereby regulation quality will be appreciably impaired. The utilization of a more powerful control valve in discharging gangue from the chamber of a highly efficient floatation machine increases its own sluggishness and, as a result, the sluggishness of the floatation installation comprising automatic means in addition to the floatation machine and impairs regulation quality.

In the disclosed automatic regulator device, the rate of gangue discharge from the chamber of the floatation machine can be changed by the use of a control valve having a nonlinear flow characteristic, a feature making it impossible to obtain required regulation quality. Such a control valve does not provide for the maximum free discharge of gangue from the chamber of the floatation machine with minimum losses of the pulp liquid phase, which gives rise to pulp level disturbances in the chamber of the floatation machine. A vertical position of the afore-mentioned control valve (with the seat of a shut-off valve located horizontally) may cause complete or partial pressing-in of the branch pipe used to discharge gangue from the chamber of the floatation machine in floatation of ore containing a great number of large and heavy fractions. Consequently, the gangue discharge rate will change (decrease) and there will occur additional pulp level disturbances in the chamber of the floatation machine, a factor further decreasing regulation quality.

In its operation, the floatation machine uses circulating water with a residual concentration of frother amounting to 70–80% of its working concentration. The rate of water flow changes as the source feed is supplied to the chamber of the floatation machine and losses occur in discharging gangue from the chamber of the floatation machine. This causes changes in the pulp level and density and also in flow hydrodynamics in the chamber of the floatation machine. Hence, maintaining the working concentration of frother in the pulp in the chamber of the floatation machine solely by changing the additional supply of frother to the chamber of the floatation machine without stabilizing the flow rate of water containing frother will fail to provide, on the one hand, adequate stabilization of water-air ratios in the bulk of aerated pulp and, consequently, of the pulp level and density and, on the other hand, a stable speed of supplying the source feed to the chamber of the floatation machine and, in effect, stable pulp flow hydrodynamics in the chamber of the floatation machine.

BRIEF DESCRIPTION OF THE INVENTION

The object of the invention is to create a device for automatic regulation of the process of separating froth concentrate from gangue in a floatation machine, which would enhance regulation quality.

This object is accomplished by providing a device for automatic regulation of the process of separating froth concentrate from gangue in a floatation machine whose chamber is provided with a gangue-discharge branch pipe and communicates via a pipeline for a source feed and an aerated liquid with a frother meter and with a pipeline feeding water and frother, comprising:

a channel for measuring the level and density of pulp in the chamber of the floatation machine, having first and second outputs;

first and second bubbling pipes of said pulp level and density measuring channel installed at different levels in said chamber of the floatation machine;

first and second air flow regulators in said pulp level and density measuring channel, communicating with the first and second bubbling pipes;

a differential pressure pickup in said pulp level and density measuring channel, communicating with the first and second bubbling pipes and having an output serving as the first output of said pulp level and density measuring channel, which develops a signal corresponding to the pulp density;

a pressure pickup in said pulp level and density measuring channel, communicating with the first bubbling pipe and having an output;

a pulp level correction unit in said pulp level and density measuring channel, having first and second data inputs and an output and connected, via its first and second data inputs, to said outputs of said pressure pickup and said differential pressure pickup, said output of said correction unit serving as the second output of said pulp level and density measuring channel and developing a signal corresponding to a pulp level corrected for density;

a channel for controlling the flow rate of frother fed to said chamber of the floatation machine, having an input and an output and connected via said input to the first output of said pulp level and density measuring channel and via said output to said frother meter;

a channel for stabilizing the level of pulp in said chamber of the floatation machine, having first and second inputs, first and second outputs; a circuit for controlling the flow rate of water containing frother and supplied to said chamber, having an input serving as the first input of said pulp level stabilizing channel and connected to the second output of said pulp level and density measuring channel, and an output serving as the first output of said pulp level stabilizing channel; a circuit for regulating the rate of gangue discharge from said chamber of the floatation machine, having an input and an output serving, respectively, as the second input of said pulp level stabilizing channel and the second output thereof;

a first control valve installed on said pipeline feeding water and frother to the chamber of the floatation machine and having an input connected to the first output of said pulp level stabilizing channel, which furnishes the first control signal in response to a pulp level deviation from a preset value;

a second gangue-discharge control valve installed on said branch pipe used to discharge gangue from the chamber of the floatation machine;

a drive of the second gangue-discharge control valve, having an input connected to the second output of said pulp level stabilizing channel;

a water-and-frother flow transducer installed on said pipeline feeding water and frother, having an output connected to the second input of said pulp level stabilizing channel, which develops at its second output the second control signal fed to said drive of the second gangue-discharge control valve in response to a deviation of the flow rate of water and frother from a preset value.

It is of advantage that, in the automatic regulator device, according to the invention, the circuit for controlling the flow rate of water containing frother and supplied to the chamber should include a pulp level control having its output connected to one input of a circuit for comparing a corrected pulp level value with a preset value, and a water-and-frother flow regulator having its input connected to the output of the circuit for comparing a corrected pulp level value with a preset value.

It is also advantageous that, in the automatic regulator device, according to the invention, the gangue-discharge control valve comprising a cylindrical case with an outlet, having on one of its ends a flange for connection with the branch pipe used to discharge gangue from the chamber of the floatation machine and accommodating a seat and a shut-off valve provided with a rod for connection with the drive of the gangue-discharge control valve should be designed so that its cylindrical case is placed in a substantially horizontal position and the outlet is found in its lower portion, whereas the shut-off valve has a cylindrical section and another section representing a parabolic cone connected with said cylindrical section and facing said seat, its axis being displaced towards the upper portion of the cylindrical case relative to the axis of the hole in said seat.

It is further advantageous that, in the automatic regulator device, according to the invention, the cross-sectional area of the cylindrical section of the shut-off valve should be determined as follows:

$$S = (1-k) \cdot S_n,$$

where S—cross-sectional area of cylindrical section;
$S_n$—area of hole in seat;
k—proportionality factor equalling minimum-to-maximum lead ratio of floatation machine.

The length of the section representing a parabolic cone is equal to the travel length of the drive of the gangue-discharge control valve.

It is preferable that, in the automatic regulator device, according to the invention, the misalignment of the axis of the shut-off valve relative to the axis of the hole in the seat should be equal to the difference between radii of the cylindrical section of the shut-off valve and of the hole in the seat.

It is also preferable that, in the automatic regulator device, according to the invention, the shut-off valve comprised in the gangue-discharge control valve should be provided with a pulp reflector disposed on the end face of its cylindrical section.

It is further preferable that, in the automatic regulator device, according to the invention, the pulp reflector should represent a disk with a circular depression on its lateral surface.

In the proposed device, in addition to the circuit for regulating the rate of gangue discharge from the chamber of the floatation machine, the pulp level stabilizing channel includes a circuit for controlling the flow rate of water and frother supplied to the chamber, which provides an additional control action comprising a change in the flow rate of water and frother and subsequent stabilization of said flow rate.

Such a change in the flow rate of water and frother fed to the chamber constitutes the second control action amplifying the regulating effect associated with a change in the rate of gangue discharge from the chamber of the floatation machine and aimed at attaining faster stabilization of the pulp level in the chamber. There occurs a decrease in maximum deviation of the pulp level in the chamber of the floatation machine from a preset value. Also decreased is the time required to adjust the pulp level from the occurrence of a pulp level deviation to the attainment of a predetermined level.

The stabilization of said flow rate of water and frother following a change in said flow rate of water and frother fed to the chamber of the floatation machine involves stabilization of the rate at which the source feed is supplied to the bulk of aerated pulp in the chamber of the floatation machine and, consequently, stabilization of pulp flow hydrodynamics in the chamber of the floatation machine, as well as stabilization of the water-and-air ratios and, in effect, of the pulp level and density in the chamber of the floatation machine.

The stabilization of the flow rate of water and frother in conjunction with the control action of the channel for controlling the rate of frother flow will substantially improve stabilization of the pulp density in the chamber of the floatation machine and, in effect, the pulp level stabilization.

The control action based on changing the flow rate of water and frother is interrelated with the control action involving a change in the rate of gangue discharge from the chamber of the floatation machine and with a disturbing factor attributable to a pulp level deviation from a preset value. A change in the pulp level has a disturbing influence on variations of the flow rate of water and frother, whereas said variations of the flow rate of water and frother exert a disturbing effect on changes in the rate of gangue discharge from the chamber of the floatation machine. Such characteristics as the pulp level, the flow rate of water and frother and the rate of gangue discharge from the chamber of the floatation machine are interrelated so that the control process ends after the pulp level in the chamber and the flow rate of water and frother reach predetermined values. Taking into account the fact that the pulp level control time is several times smaller than the pulp density control time in the chamber of the floatation machine there will not be any significant changes in the pulp density or undesirable variations of pulp flow hydrodynamics in the chamber of the floatation machine during pulp level stabilization while a change occurs in the flow rate of water and frother. Inasmuch, as the pulp level in the chamber of the floatation machine is a prime parameter, a change in the flow rate of water and frother and its subsequent stabilization will, as a whole, prove out and ensure quality control of the floatation process.

The regulation quality is also increased by including in the proposed device a control valve for changing the rate of gangue discharge from the chamber of the floatation machine whose flow characteristic is essentially linear. This flow characteristic is made linear due to the fact that the shut-off valve has a working section representing a parabolic cone. A horizontal position of said control valve prevents the pressing of the branch pipe used to discharge gangue from the chamber of the floatation machine in case the gangue contains many large and heavy fractions and substantially decrease pulp level disturbances caused by a change in the rate of gangue discharge, a feature appreciably improving the control quality. A vertical displacement of the shut-off valve comprised in the control valve relative to the seat axis provides for the maximum free discharge of gangue from the chamber of the floatation machine with minimum losses of the pulp liquid phase, which improves the pulp level stabilization.

BRIEF DESCRIPTION OF THE ACCOMPANYING DRAWINGS

The invention will now be described further with reference to specific embodiments thereof, taken in conjunction with the accompanying drawings, wherein:

FIG. 1 is a general view of a floatation installation with a channel for measuring the level and density of pulp in the chamber of a floatation machine, a channel for controlling the flow rate of frother and a channel for stabilizing the pulp level in the chamber of a floatation machine, comprising a circuit for regulating the rate of gangue discharge and a circuit for controlling the flow rate of water and frother, according to the invention;

FIG. 2 is a functional diagram showing a pulp level correction unit, the frother flow control channel and the pulp level stabilizing channel, according to the invention; and FIG. 3 is a general view of a gangue-discharge control valve (a longitudinal view of a case), according to the invention.

DETAILED DESCRIPTION OF THE INVENTION

Figure 1:
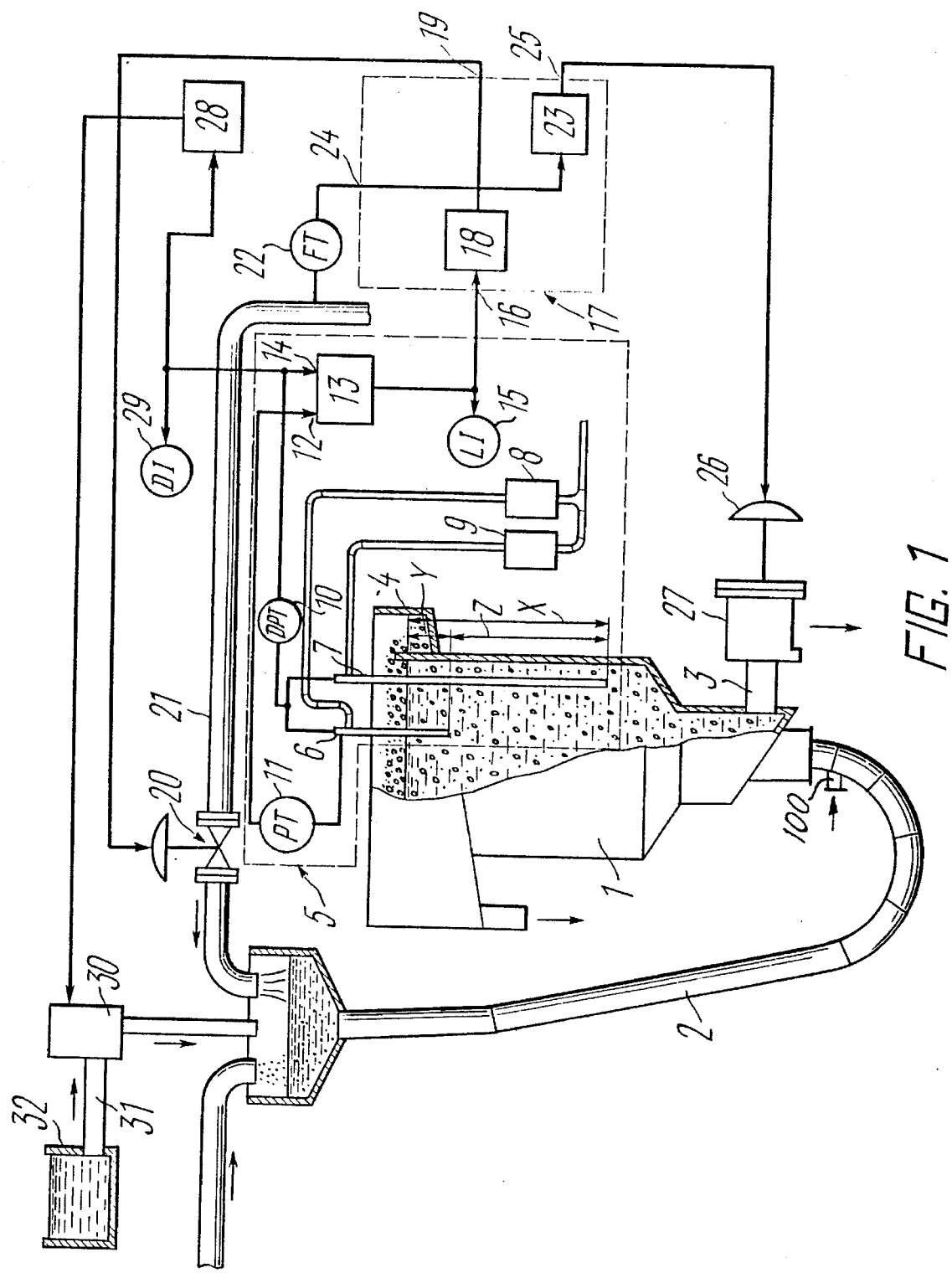

The proposed device for automatic regulation of the process of separating froth concentrate from gangue in a floatation machine will be described by way of example by reference to a floatation installation comprising a single-chamber floatation machine with source feed supplied as small fractions of ore on the underside of a chamber 1 (FIG. 1) through a pipeline 2. The chamber 1 has a gangue-discharge branch pipe 3 in its lower portion and a chute 4 adapted to collect froth concentrate and disposed in the upper portion of the chamber. The device forming the subject of the present invention includes a channel 5 for measuring the level and density of pulp in the chamber of the floatation machine, in which two bubbling pipes 6 and 7 installed at different levels Y and X in the pulp in the chamber 1 of the floatation machine are connected with air flow regulators 8 and 9, respectively, and with a differential pressure pickup 10. The bubbling pipe 6 is also in communication with a pressure pickup 11 whose output is connected tea data input 12 of a pulp level correction unit 13 included in the pulp level and density measuring channel 5. A data input 14 of the correction unit 13 is connected to the output of the differential pressure pickup 10, while its output is connected to the input of a pulp level recorder 15 and to an input 16 of a channel 17 for stabilizing the level of pulp in the chamber of the floatation machine.

The channel 17 for stabilizing the level of pulp in the chamber of the floatation machine incorporates a circuit 18 for controlling the flow rate of water and frother supplied to the chamber, its input serving as the input 16 of the pulp level stabilizing channel 17, which receives a signal corresponding to the pulp level in the chamber 1 after correction for density. The output of the circuit 18 for controlling the flow rate of water and frother serves as an output 19 of the pulp level stabilizing channel 17 and is connected with a control valve 20 installed on a pipeline 21 feeding water and frother to the chamber of the floatation machine. The pipeline 21 also mounts a water-and-froth flow transducer 22 whose output is connected to the input of a circuit 23 for regulating the rate of gangue discharge from the chamber of the floatation machine, which serves as an input 24 of the pulp level stabilizing channel 17.

The circuit 23 for regulating the rate of gangue discharge has its output acting as a second output 25 of the pulp level stabilizing channel 17 connected to a drive 26, say a pneumatic drive of a gangue-discharge valve 27 installed on the branch pipe 3 used to discharge gangue from the chamber of the floatation machine. The circuit 23 develops at its output a control signal in response to a deviation of the flow rate of water and frother from a preset value.

The device forming the subject of the present invention further comprises a channel 28 for controlling the flow rate of frother, which is connected via its input to the output of the differential pressure pickup 10 and to the input of a pulp density recorder 29, while its output is connected to a frother meter 30 which is connected via a pipeline 31 to a service tank 32 holding frother and to the pipeline 2 supplying the source feed to the chamber of the floatation machine.

In the floatation installation of FIG. 1 frother, pulp and water are mixed up directly in the pipeline 2. If in addition to frother the pulp includes ether floatation agents, the installation may comprise a mixing tank wherein these floatation agents are brought in contact with the solid phase of the pulp.

Figure 2:
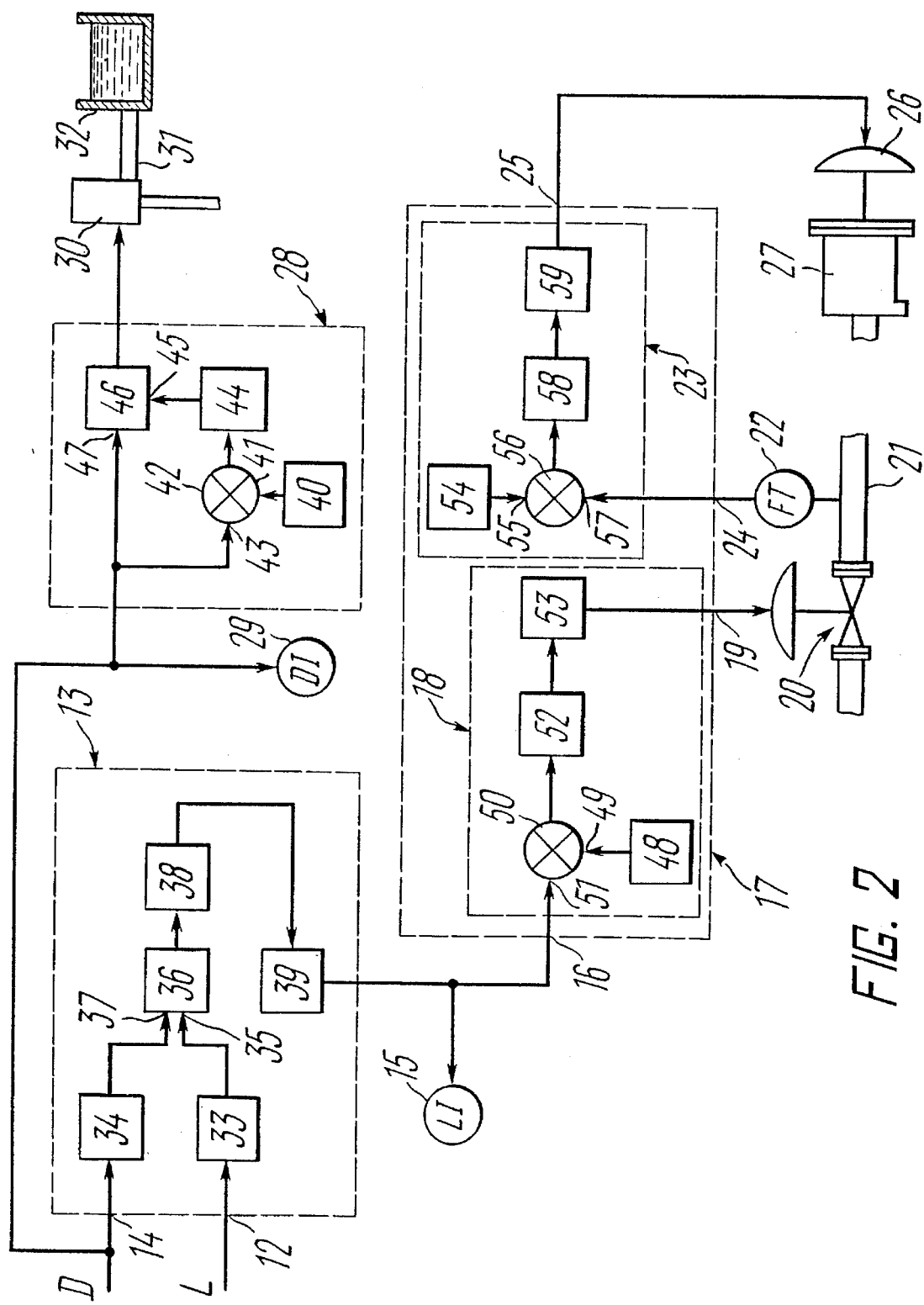

The pulp level correction unit 13 comprises analog current-to-voltage converters 33 (FIG. 2), 34, the input of the first converter serving as the input 12, while the input of the second converter serves as the input 14 of the pulp level correction unit 13. The output of the analog current-to-voltage converter 33 is connected to an input 35 of a unit 36 used to divide a pulp level signal by a pulp density signal and having its input 37 connected to the output of the analog current-to-voltage converter 34. The output of the divider unit 36 is connected to the input of a multiplier unit 38 whose output is connected to the input of an analog voltage-to-current converter 39. The output of the analog voltage-to-current converter 39 serves as the output of the pulp level correction unit 13 and is connected to the input of the pulp level recorder 15 and to the input 16 of the pulp level stabilizing channel 17.

The channel 28 for controlling the flow rate of frother comprises a pulp density control 40 whose output is connected to one input 41 of a circuit 42 used to compare a measured pulp density value with a preset value and having its ether input 43 combined with the input of the channel 28 for controlling the flow rate of frother. The output of the comparison circuit 42 is connected to the input of an analog pulse-length regulator 44 whose output is connected to a pulse-length control input 45 of an automatic frother metering system 46 having its pulse-frequency control input 47 connected to the input 43 of the comparison circuit 42. The automatic frother metering system 46 develops at its output current pulses adjustable in frequency and length, said output serving as the output of the channel 28 for controlling the flow rate of frother.

The circuit 18 for controlling the flow rate of water and frother supplied to the chamber, comprised in the channel 17 for stabilizing the level of pulp in the chamber of the floatation machine, is provided with a pulp level control 48 having its output connected to one input 49 of a circuit used to compare a corrected pulp level value with a preset value, its other input 51 serving as the input 16 of the pulp level stabilizing channel 17. The output of the comparison circuit 50 is connected to the input of a means 52 for controlling the flow rate of water and frother, its output being connected to the input of an electropneumatic converter 53. The output of the electropneumatic converter 53 functions as the output of the circuit 18 for controlling the flow rate of water and frother supplied to the chamber and also as the output 19 of the pulp level stabilizing channel 17 and is connected to the control valve 20 provided with a pneumatic actuator.

In the pulp level stabilizing channel 17, the circuit 23 for regulating the rate of gangue discharge from the chamber of the floatation machine comprises a means 54 for controlling the flow rate of water and frother, said means having its output connected to one input 55 of a circuit 56 used to compare a measured value of the water flow rate with a preset value. Its other input 57 serves as the input of the circuit 23 for regulating the rate of gangue discharge and also as the input 24 of the pulp level stabilizing channel 17 and is connected to the output of the water-and-frother flow transducer 22. The output of the comparison circuit 56 is connected to the input of a means 58 for regulating the rate of gangue discharge from the chamber of the floatation machine, said means having its output connected to the input of an electropneumatic converter 59. The output of said converter serves as the output of the circuit 23 for regulating the rate of gangue discharge and also as the output 25 of the pulp level stabilizing channel 17 and is connected to the drive 26 of the valve 27 controlling the discharge of gangue from the chamber of the floatation machine.

Figure 3:
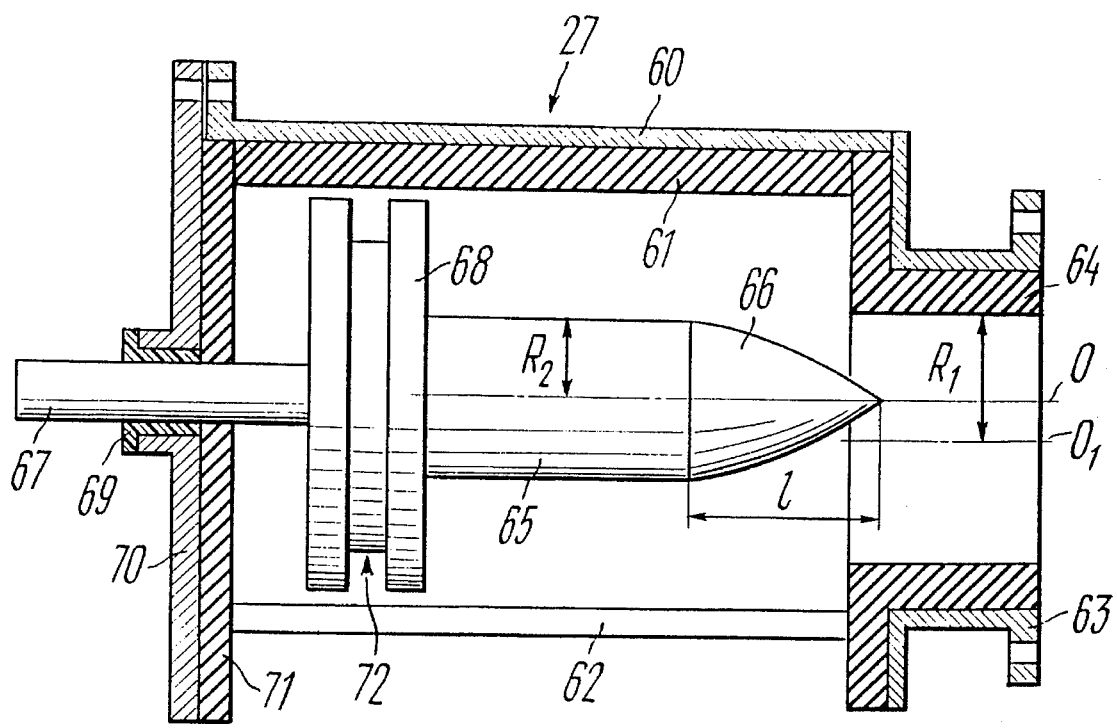

The valve 27 controlling the discharge of gangue and placed on the branch pipe 3 (FIG. 1) used to discharge gangue from the chamber of the floatation machine is provided with a horizontally disposed cylindrical case 60 (FIG. 3) with a lining 61, for example, a rubber lining, said case having in its lower portion a hole 62 adapted to discharge gangue. Fitted on one of the ends of the case 60 is a flange 63 for connection with the discharge branch pipe 3 (FIG. 1). A seat 64 made of a suitable wear-resistant material, for example, rubber, is installed in the case 60 (FIG. 3), more particularly, within the flange 63. The case 60 also contains a shut-off valve having a cylindrical section 65 and a section 66 representing a parabolic cone connected with said cylindrical section and facing the seat 64. The cylindrical section 65 is rigidly linked a rod 67 and with a pulp reflector 68 made of a suitable wear-resistant material and disposed on the end face of the cylindrical section 65. The rod 67 is inserted in a plain bearing 69 placed on a cover 70 of the case 60 with a lining 71, for example, a rubber lining and linked with the rod of the drive 26 (FIG. 1) of the control valve 27. The "O" axis (FIG. 3) of the shut-off valve aligned with the axis of the case 60 is displaced upwards relative to the "$O_1$" axis of the hole in the seat 64, the eccentricity value being equal to the difference between the radius $R_1$ of the hole in the seat 64 and the radius $R_2$ of the cylindrical section 65 of the shut-off valve. This provides for the maximum free discharge of gangue from the chamber 1 (FIG. 1) of the floatation machine with minimum losses of the liquid phase of the pulp (water mixed with frother) and prevents the clogging of the hole in the seat 64 (FIG. 3) and the gangue-discharge branch pipe 3 (FIG. 1) with foreign objects and also when the discharge gangue contains many large and heavy fractions.

The cross-sectional area S of the cylindrical section 65 (FIG. 3) of the shut-off valve is determined from the following equation:

$$S = (1-k) \cdot S_n \quad /1/$$

where $S_n$—area of hole in seat 64; and k—proportionality factor equalling minimum-to-maximum lead ratio of floatation machine.

Such a relationship is chosen to ensure that the variation range of the flow section of the gangue-discharge branch pipe 3 (FIG. 1) corresponds to the variation range of the initial load acting on the floatation machine.

The length of the section 66 (FIG. 3) of the shut-off valve representing a parabolic cone is equal to the maximum travel length of the drive 26 (FIG. 1) of the gangue-discharge control valve 27. The generatrix of the section 66 (FIG. 3) is determined from the following equation:

$$S_i = \frac{l_i}{l} \cdot S \quad /2/$$

where $S_1$—cross-sectional area of section 66 representing parabolic cone at distance i from vertex;

S—cross-sectional area of cylindrical section 65 of shut-off valve;

l—length of section 66 representing parabolic cone;

$l_i$—distance from vertex of section 66 representing parabolic cone to cross-section of section 66 at distance i from vertex.

Such a shape and length of the section 66 representing a parabolic cone make essentially linear the flow characteristic of the gangue-discharge control valve 27 (FIG. 1) and ensure continuous variations of the rate of gangue discharge, a factor substantially improving quality of automatic pulp level control.

The pulp reflector 68 (FIG. 3) protects the rod 67 from wear under the action of pulp, particularly abrasive pulp, thereby increasing operational reliability of the gangue-discharge control valve 27 (FIG. 1).

The pulp reflector 68 (FIG. 3) is made as a disk having on its lateral surface a circular depression 72 designed to remove the pulp fed through the gap between the pulp reflector 68 and the lining 61.

The afore-mentioned advantages of the gangue-discharge control valve 27 (FIG. 1) are particularly apparent when said valve is used for regulating the discharge rate of abrasive pulp and pulp containing a substantial percentage of large and heavy fractions.

The automatic frother metering system 46 (FIG. 2) described above uses circuitry widely known to those skilled in the art.

The proposed device for automatic regulation of the process of separating froth concentrate from gangue in a floatation machine operates as follows.

As froth concentrate is separated from gangue in a floatation machine, continuous measurements are made of the level and density of pulp in the chamber 1 (FIG. 1) of the floatation machine.

It is known that variations of the pulp density in the chamber of the floatation machine result in a pressure change in the bubbling pipes. The pressure in each of the bubbling pipes is determined as $$P = \rho \cdot h \quad /3/$$

where P—pressure in each bubbling pipe;

$\rho$—density of pulp (or liquid) surrounding bubbling pipes;

h—depth of immersion of each bubbling pipe in pulp (or liquid).

In the proposed device, pressure $P_1$ of the bubbling pipe 6 is proportional both to pulp density $\rho$ and to depth Y of its immersion in the pulp, that is, $$P_1 = \rho \cdot Y \qquad /4/$$

Accordingly, pressure $P_2$ in the bubbling pipe 7 will be determined as $$P_2 = \rho \cdot X \qquad /5/$$

where X is depth of immersion of the bubbling pipe 7 in the pulp.

Subtracting equation /4/ from equation /5/ we get $$\Delta P = P_2 - P_1 = \rho(X-Y) \qquad /6/$$

where $\Delta P$ is a differential pressure in the bubbling pipes 6 and 7.

Since $X-Y=Z$ where Z is a height difference of the bubbling pipes 6 and 7, we shall have $$\Delta P = Z \cdot \rho. \qquad /7/$$

Hence, a pressure difference in the bubbling pipes 6 and 7 will be proportional to the pulp density in the chamber 1 of the floatation machine and to a height difference of the bubbling pipes 6 and 7 immersed in the pulp and will not depend on pulp level variations in the chamber 1 of the floatation machine.

The signals conveying information on pressure in the bubbling pipes 6 and 7 are applied to the input of the differential pressure pickup 10, in which they are converted into a direct-current signal proportional to the pulp density, which is fed to the input of the pulp density recorder 29, to the input of the channel 28 for controlling the flow rate of frother and to the data input 14 of the pulp level correction unit 13.

The measurement of the pulp level in the chamber 1 of the floatation machine involves the measurement of pressure in the bubbling pipe 6 by means of the pressure pickup 11. Inasmuch, as pressure $P_1$ in the bubbling pipe 6 depends both on the pulp level in the chamber 1 of the floatation machine determined by the depth Y of immersion of the bubbling pipe 6 in the pulp and on the pulp density according to equation /4/, the direct-current signal at the output of the pressure pickup 11 will be also dependent on the pulp level and density in the chamber 1 of the floatation machine. To eliminate errors in pulp level measurements due to variations of the pulp density in the chamber 1 of the flotation machine, the direct-current signal derived from the output of the pressure pickup 11 is applied to the data input 12 of the pulp level correction unit 13, whence said signal is fed to the input of the analog current-to-voltage converter 33 (FIG. 2) to be converted into a proportional d.c. voltage applied to the input 35 of The divider unit 36. The direct-current signal proportional to the pulp density is fed to the input of the analog current-to-voltage converter 34 via the data input 14 of the pulp level correction unit 13, in which it is converted into a proportional d.c. voltage applied thereafter to the input 37 of the divider unit 36. The d.c. voltage proportional to the ratio of the signal arriving at the input 35 to the signal arriving at the input 37 of the divider unit 36 is applied from the output of the divider unit 36 to the multiplier unit 38. The output voltage of the multiplier unit 38 is fed to the input of the analog voltage-to-current converter 39 wherein it is converted into direct current which is subsequently applied to the input of the pulp level recorder 15 and to the input 16 of the pulp level stabilizing channel 17.

When froth concentrate is separated from gangue in the floatation machine, related adjustments are made of such parameters as the pulp level and density in the chamber 1 (FIG. 1) of the floatation machine and the flow rate of water and frother supplied to the chamber 1 of the floatation machine.

Related parametric adjustments involve, in this case, certain difficulties associated with the fact that, during separation of froth concentrate from gangue in the chamber 1 of the floatation machine, there occurs a change in residual concentration of frother in circulating water supplied to the chamber 1 of the floatation machine. This causes variations of the pulp density in the chamber 1 and necessitates control of the flow rate of frother supplied to the chamber 1 of the floatation machine with a view to restoring the pulp density and ensuring the separation of froth concentrate from gangue in the chamber 1 of the floatation machine. The pulp density variations cause an additional change in the level of the pulp in the chamber 1 of the floatation machine. The pulp level in the chamber 1 is a prime parameter since its excessive increase causes the clogging of froth concentrate with gangue and impairs the extraction of a useful constituent from the source feed supplied to the froth layer due to the fact that the position of the froth layer has changed. An excessive decrease in the pulp level results in a lesser yield of froth concentrate and in losses of the useful constituent due to untimely discharge of froth concentrate into the frother collection chute 4 whereby the useful constituent will settle on the bottom of the chamber 1 of the floatation machine. With the above factor taken into account, the proposed device for regulating the separation process is designed so that the pulp level is stabilized by controlling the rate of gangue discharge from the chamber 1 of the floatation machine and also the flow rate of water and frother supplied to the chamber 1 of the floatation machine with subsequent stabilization of the flow rate of water and frother to provide for indirect stabilization of the pulp density in the chamber 1 of the floatation machine.

The rate of frother flow is controlled by means of the channel 28 for controlling the flow rate of frother, its input receiving a current signal from the output of the differential pressure pickup 10, which is proportional to the pulp density in the chamber 1 of the floatation machine. The channel 28 for controlling the flow rate of frother produces an output signal representing direct-current pulses varying in frequency and length and applied to the frother meter 30 which operates, thus feeding portions of frother to the chamber 1 of the floatation machine. In the channel 28 for controlling the flow rate of frother, a direct-current signal proportional to the pulp density is fed to the input 47 (FIG. 2) controlling the frequency of pulses furnished by the automatic frother metering system 46 and also to the input 43 of the circuit 42 used to compare a measured value of the pulp density with a preset value, the input 41 of said circuit receiving a direct-current signal from the control 40 to obtain the desired density of the pulp.

When the signals indicative of the measured and preset pulp densities are equal, the differential signal at the output of the comparison circuit 42 is zero. The analog pulse-length regulator 44 produces a direct-current signal which has a constant magnitude and is applied to the pulse-length control input 45 of the automatic frother metering system 46. The output signal of this system represents square d.c. pulses, the frequency of which is proportional to the direct-current signal at the input 47 of the system 46, whereas their duration is proportional to the direct-current signal at its input 45. The square d.c. pulses derived from the automatic frother metering system 46 are applied to the input of the frother meter 30 which operates feeding portions of frother to the chamber 1 (FIG. 1) of the floatation machine.

When the signal proportional to the pulp density increases or decreases, the frequency of the output pulses of the automatic frother metering system 46 (FIG. 2) will increase or decrease accordingly. At the same time, the comparison circuit 42 will develop at its output a direct-current signal corresponding to the difference between the signal proportional to the measured pulp density and the signal from the pulp density control 40. Thereafter, the differential signal is fed to the input of the analog pulse-length regulator 44 whose output signal increases or decreases according to the proportional-plus-integral control law. Next, the output signal of the analog pulse-length regulator 44 is applied to the pulse-length control input 45 of the automatic frother metering system 46 whereby the duration of its output square d.c. pulses will increase or decrease. Thus, the frequency and duration of the d.c. pulses at the output of the automatic frother metering system 46 increase or decrease, which causes a corresponding increase or decrease in the supply of frother to the chamber 1 (FIG. 1) of the floatation machine. A change in the frother supply brings about a variation of frother concentration in the pulp fed through the pipeline 2 to the chamber 1 of the floatation machine and, consequently, a variation of the pulp density in the chamber 1. The flow rate of frother changes until the pulp density equals a preset value.

When froth concentrate is separated from gangue, the pulp level in the chamber 1 of the floatation machine will be stabilized by means of the pulp level stabilizing channel 17 whose input 16 receives a direct-current signal proportional to a corrected value of the pulp level in the chamber 1 of the floatation machine, said direct-current signal coming from the output of the pulp level correction unit 13. The input 24 of the pulp level stabilizing channel 17 simultaneously receives a direct-current signal from the output of the flow transducer 22 for water and frother supplied to the chamber 1 of the floatation machine via the pipeline 21. The pulp level stabilizing channel 17 effects two control actions. The first control action is provided at the output 19 of the pulp level stabilizing channel 17 by the circuit 18 for controlling the flow rate of water and frother supplied to the chamber. The second control action is provided at the output 25 of the pulp level stabilizing channel 17 by the circuit 23 for regulating the rate of gangue discharge. The channel 17 for stabilizing the pulp level in the chamber of the floatation machine is formed so that the process control ends only after the pulp level in the chamber 1 of the floatation machine and the flow rate of water and frother supplied to the chamber 1 of the floatation machine reach preset values.

In the channel 17 for stabilizing the pulp level in the chamber of the floatation machine, a direct-current signal proportional to a corrected value of the pulp level in the chamber 1 is fed to the input 51 (FIG. 2) of the circuit 50 for comparing a corrected value of the pulp level with a preset value, the input 49 of said circuit receiving a direct-current signal from the pulp level control 48. When the signal from the pulp level control 48 and the signal corresponding to a corrected value of the pulp level and fed to the input 51 of the comparison circuit 50 are equal, the output signal of said comparison circuit is zero. The output signal of the comparison circuit 50 is applied to the input of the means 52 for controlling the flow rate of water and frother, which produces a direct-current signal having a constant magnitude and fed to the input of the electropneumatic converter 53 wherein it is converted into a proportional pneumatic signal.

Thereafter, said signal is applied to the control valve 20 having a pneumatic actuator and installed on the pipeline 21. Water containing frother is supplied through the control valve 20 to the chamber 1 (FIG. 1) of the floatation machine. The pipeline 21 is provided with the water-and-frother flow transducer 22 whose output direct-current signal is proportional to the flow rate of water and frother supplied over the pipeline 21 to the chamber 1 of the floatation machine. The output signal of the water-and-frother flow transducer 22 is applied to the input 57 (FIG. 2) of the circuit 56 for comparing the measured flow rate of water and frother with a preset value, the second input 55 of said circuit receiving a direct-current signal from the water-and-frother flow control 54. When the above signals are equal, the output signal of the comparison circuit 56 is zero. The output signal of the comparison circuit 56 is fed to the input of the analog means 58 for regulating the rate of gangue discharge from the chamber of the floatation machine. Said analog means furnishes a direct-current signal having a constant magnitude and fed to the input of the electropneumatic converter 59 wherein it is converted into a proportional pneumatic signal. Next, said signal is applied to the pneumatic drive 26 of the control valve 27 enabling the discharge of gangue from the chamber of the floatation machine. The gangue is discharged from the chamber 1 (FIG. 1) of the floatation machine through the control valve 27.

As the pulp level in the chamber 1 of the floatation machine increases or decreases, there will occur a corresponding increase or decrease in the amplitude of the signal at the input 51 (FIG. 2) of the circuit 50 for comparing a corrected value of the pulp level with a preset value. The comparison circuit 50 develops at its output a direct-current signal equal to the difference between the signal from the pulp level control 48 and the signal corresponding to a corrected value of the pulp level and fed to the input of the analog means 52 for controlling the flow rate of water containing frother. The direct-current signal at the output of said analog means will increase or decrease according to the proportional-plus-integral control law and come to the input of the electropneumatic converter 53 wherein it is converted into a proportional pneumatic signal. Next, said signal comes to the control valve 20. Thus, there will occur a decrease or increase in the flow rate of water containing frother and supplied via the control valve 20 to the chamber 1 (FIG. 1) of the floatation machine, which partially compensates for an increase or decrease in the pulp level in the chamber 1 of the floatation machine.

As the flow rate of water containing frother decreases or increases, there will occur a corresponding decrease or increase in the amplitude of the direct-current signal at the output of the water-and-frother flow transducer 22, said signal being fed to the input 57 (FIG. 2) of the circuit 56 for comparing the measured flow rate of water and frother with a preset value. The latter circuit develops at its output a signal indicative of the difference between the signal from the means 54 for controlling the flow rate of water containing frother and the signal corresponding to the measured flow rate of water and frother. Then the differential signal is applied to the input of the analog means 58 for regulating the rate of gangue discharge from the chamber of the floatation machine, the output signal of said means decreasing or increasing according to the proportional-plus-integral control law. Said output direct-current signal is fed to the input of the electropneumatic converter 59 wherein it is converted into a proportional pneumatic signal. Next, said signal is applied to the pneumatic drive 26 of the control valve 27 enabling the discharge of gangue from the chamber of the floatation machine. The drive 26 moves, in proportion to the pneumatic signal, its rod and, consequently, the rod 67 (FIG. 3) of the gangue-discharge control valve 27 whereby the shut-off valve comprised in the control valve 27 will move relative to the seat 64. There occurs a linear increase (decrease) in the flow section of the hole in the seat 64 of the control valve 27 enabling the discharge of gangue from the chamber of the floatation machine, which causes a corresponding increase (decrease) in the rate of gangue discharge from the chamber 1 (FIG. 1) of the floatation machine and restoration of the preset pulp level in the chamber 1 of the floatation machine.

At the moment the pulp level in the chamber 1 of the floatation machine reaches a preset value, the flow rate of water containing frother and supplied to the chamber 1 may differ from the rating. An error signal from the output of the circuit 56 (FIG. 2) for comparing the measured flow rate of water and frother with a preset value is applied to the input of the analog means 58 for regulating the rate of gangue discharge from the chamber of the floatation machine, which continues to generate a control signal, a factor causing a decrease (increase) in the rate of gangue discharge from the chamber 1 (FIG. 1) of the floatation machine. Consequently, there will occur a slight deviation of the pulp level in the chamber 1 of the floatation machine, which results in a variation of the flow rate of water containing frother and supplied to the chamber 1 of the floatation machine.

Thus, the flow rate of water containing frother and supplied to the chamber 1 of the floatation machine and the rate of gangue discharge from the chamber 1 of the floatation machine will be controlled until the pulp level in the chamber 1 and the flow rate of water containing frother and supplied to the chamber 1 of the floatation machine reach preset values.

To avoid system driving during the control action, the analog control means 52 (FIG. 2) and 58 are differently adjusted, mere particularly, the analog means 58 is characterized by a smaller gain and a larger integration period as compared with the analog means 52.

Such a structure of the proposed device for automatic regulation of the process of separating froth concentrate from gangue in the floatation machine and also the utilization of the discharge valve with a linear flow characteristic make it possible to decrease a maximum deviation of the pulp level and density from preset values during the control action and to reduce fluctuations and the time of controlling the pulp level and density in the chamber of the floatation machine.

What is claimed is:

1. A flotation control apparatus comprising:

a flotation machine comprising a pulp filled chamber, said machine being provided with a gangue discharge branch pipe, a source feed pipe line, a frother meter means for feeding a frother and pipeline means for feeding water-and-frother;

said means for measuring the level and density of the pulp comprising first and second bubbling pipes installed at different levels in said chamber with respect to the level of the pulp;

said means for measuring the level and density of the pulp further comprises first and second regulator means for regulating the air flow rate fed to the bubbling pipes, said first and second regulator means being connected to the first and second bubbling pipes respectively;

said means for measuring the level and density of the pulp further comprising a differential transducer means connected with the first and second bubbling pipes and having an output serving as the first output of said means for measuring the level and density of the pulp, and said first outlet develops a signal corresponding to the density of the pulp;

said means for measuring the level and density of the pulp further comprising a pressure detection means connected with the first bubbling pipe and having an output;

said means for measuring the level and density of the pulp further comprising correction means having first and second data inputs and an output, said correcting means is connected via said first and second data inputs to the output of said pressure detection means and said differential transducer means, respectively, said output of said correction means serving as the second output of said means for measuring the level and density of the pulp, said correction means develops an output signal which corresponds to the increase in the level of pulp corrected for density;

control means for regulating the flow rate of frother fed to said chamber of the flotation machine, having an input and an output and connected via said input to the first output of said means for measuring the level and density of pulp and via said output to said frother meter means; stabilization means for stabilizing the level of pulp in the chamber of the flotation machine, having first and second input and first and second output; said stabilization means comprises a first curcuit means for controlling the flow rate of the water-and-frother being supplied to the chamber, said first curcuit means for controlling the flow rate of the water-and-frother having an input serving as the first input of said pulp level stabilization means, said stabilization means being connected via its first input to the second output of said means for measuring the level and density of the pulp, said first curcuit means having a first output serving as the first output of the pulp level stabilization means; a second curcuit means for regulating the rate of gangue discharged from the chamber of the flotation machine, having an input and an output serving, respectively, as the second input of said means for stabilizing the level of the pulp and the second output thereof;

a water-and-frother control valve means installed on said pipeline feeding water-and-frother to said chamber of the flotation machine and having an input connected to the first output of said pulp level stabilization means, which furnishes the first control signal in response to an increase in the pulp level deviation from a preset value;

a gangue-discharge control valve means installed on said branch pipe used for discharging gangue from said chamber of the flotation machine;

said gangue-discharge valve control means having drive means which has an input connected to the second output of the pulp level stabilization means;

a water-and-frother flow transducer means installed on said pipeline feeding water-and-frother, having an output connected to the second input of said pulp level stabilization means, which develops at the second output of the stabilization means the second control signal fed to said drive means of the gangue-discharge control valve means in response to a deviation of the flow rate of water-and-frother from a preset value.

2. The flotation control apparatus as claimed in claim 1, wherein the pulp level correction means comprises:

a first current to voltage converter means having an input serving as the first data input of the correcting means which receives a signal from the pressure detection means, and said first converter means having an output;

a second current to voltage converter means having an input serving as the second data input of said correction means which receives a signal from the differential transducer means, said signal corresponding to the pulp density, and said second converter means having an output;

a first divider means having first and second input connected to the output of the first and second current to voltage converter means, respectively, and an output which is the ratio of the signals of the first input to the second input of the divider means;

a first multiplier means having an input connected to the output of the first divider means and the multiplier means having an output which is connected to the input of a voltage to current converter means which has an output which corresponds to the second output of the means for measuring the level and density of the pulp.

3. The flotation control apparatus as claimed in claim 1, wherein said first curcuit means for controlling the flow rate of the water-and-frother being admitted to the chamber comprises:

a comparison curcuit means for comparing an output signal of the pulp level correction means with a preset value, said comparison curcuit means having a first input connected to the output of the pulp level correction means, a second input and an output;

means for setting the preset value having an output connected with the second input of the comparison curcuit means, and;

means for regulating the flow rate of the water-and-frother having an input connected to the output of the comparison curcuit means and said output of the regulating means serving as the first control signal of the pulp stabilizing means.

* * * * *